May 14, 1940. F. A. THAHELD 2,200,758
ROD GUIDE
Filed Jan. 25, 1936

Inventor
Feri A. Thaheld

By Jack A. Ashley
Attorney

Patented May 14, 1940

2,200,758

UNITED STATES PATENT OFFICE 2,200,758

ROD GUIDE

Feri A. Thaheld, Dallas, Tex., assignor to The Guiberson Corporation, Dallas, Tex., a corporation of Delaware Application January 25, 1936, Serial No. 60,798

10 Claims. (Cl. 308—4)

This invention relates to new and useful improvements in rod guides.

One object of the invention is to provide an improved rod guide arranged to be positioned in the tubing so that the rod slides therethrough and is more efficiently guided.

Another object of the invention is to provide a stationary rod guide having a vertically elongate contact with the tubing and the rod, whereby the rods are substantially centered in the tubing.

Still another object of the invention is to provide a stationary rod guide having an elongate resilient cylindrical exterior for frictionally engaging in the tubing, and an inner rod guiding member, whereby a vertically amplified seating or engaging contact with the tubing is provided; also a long bearing for the rod obtained, which makes for reduced wearing and less frequent replacing.

A further object of the invention is to provide a rod guide having a rounded exterior structure and being resilient, whereby it may be more readily inserted in the tubing; and also whereby it will deform to not only provide elongate contacts, but to exert sufficient elastic force to hold it in position.

A particular object of the invention is to provide a stationary rod guide so arranged as to provide maximum vertical fluid passages and yet being sufficiently resilient to compensate irregularities in the tubing, thereby becoming self-aligning.

A construction designed to carry out the invention will be hereinafter described, together with other features of the invention.

Figure 1:
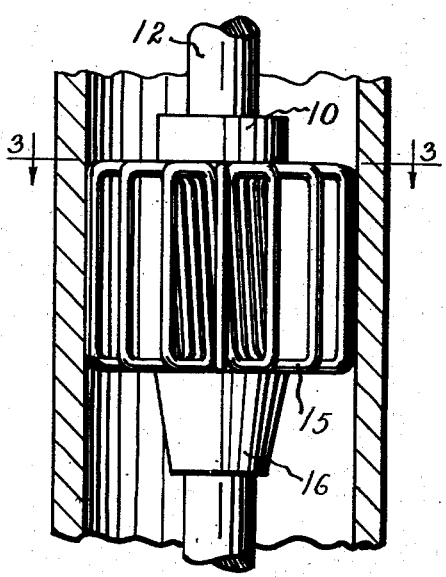
Figure 2:
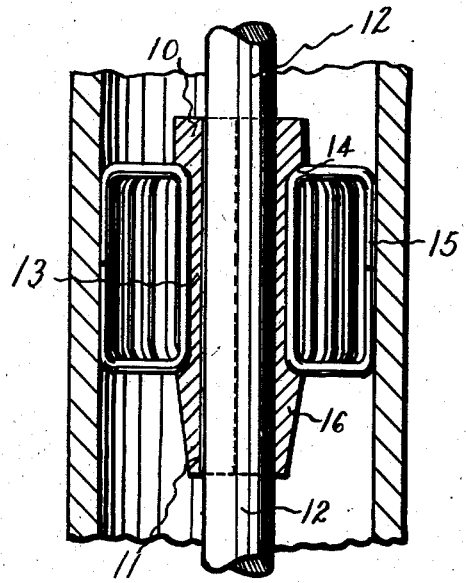
Figure 3:
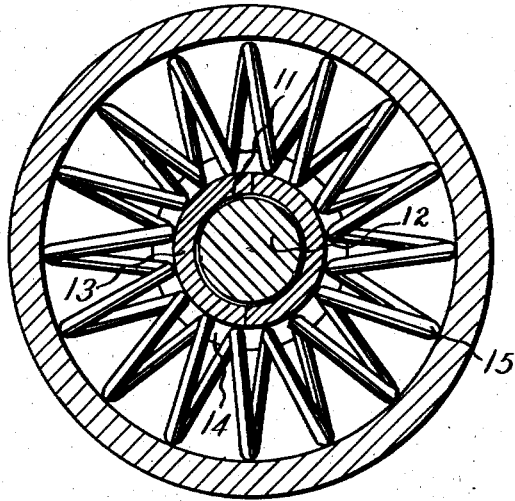
Figure 4:
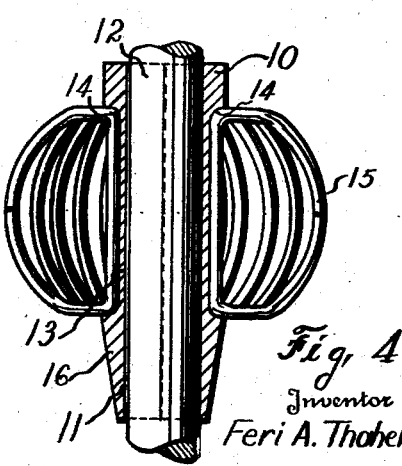

The invention will be more readily understood from a reading of the following specification and by reference to the accompanying drawing, in which an example of the invention is shown, and wherein:

Figure 1 is a view of a device constructed in accordance with the invention, positioned in a tubing which is illustrated in section, Figure 2 is a vertical sectional view of the same, Figure 3 is an enlarged horizontal cross-sectional view taken on the line 3—3 of Figure 1, and Figure 4 is a vertical sectional view of the guide when out of the tubing.

In the drawing, the numeral 10 designates a cylindrical body or bushing having an axial bore 1 extending therethrough. The bushing is preferably formed of bronze or some suitable material or forming a bearing for the rod 12 which slides in the bore of the bushing; however it is preferable to provide considerable clearance between the rod and the bore, so that the rod may slide freely and prevent displacement of the bushing thereby. The bushing is made in two longitudinal sections or halves, so that it may be assembled on the rod. As pump rods for wells usually have heads at each end, it is necessary to split the bushing in order to place it on the rod.

The bushing is provided with a cylindrical shank 13, intermediate its ends, having concaved annular shoulders 14 at its top and bottom. An annular resilient collar or supporting member 15 is mounted on the shank and is sustained against vertical displacement by the shoulders 14. It is preferable to make the collar in the form of an annular spring coil, using heavy wire for the purpose. It is preferable to form the collar with a cylindrical bore to snugly engage the shank 13, and to vertically curve the outer convolutions of the coil, as is shown in Figure 4. The collar is given a normal medial diameter which is greater than the inner diameter of the tubing, so that when the guide is inserted in the tubing the collar will be deformed into a cylindrical shape as is shown in Figures 1 and 2. The compressed coil will not only provide elongate vertical contacts, but will exert sufficient elastic force to hold the guide in place. While the collar has been shown in the form of a spring coil it could be formed otherwise so long as it provides the desired resiliency and supporting functions.

In operation, the rods 12 are lowered into the tubing as is the usual practice. When it is desired to place a guide on a rod, the collar 15 is engaged around the rod and the two halves of the bushing 10 are positioned on the rod above the collar. The collar is pushed upwardly onto the lower tapered end 16 of the bushing, whereby said collar is expanded and may then be forced onto the shank 13. The collar has a snug fit on the bushing and is held against movement vertically thereof by the shoulders 14.

The rod with the guide thereon is lowered into the tubing. When the guide enters the tubing, its resilient collar will be compressed or deformed so as to engage the inner wall and remain stationary, the rod sliding down through the bore 11 of the bushing until the head of the rod engages said bushing. The guide will be slid down the inside of the tubing. This will position the guide and it will remain stationary thereafter, unless the rod is further lowered. When the rod is reciprocated to pump the well, it will slide through the bushing and the oil passing up the tubing will lubricate the same.

The resilient collar 15 will confine the bushing members about the rod, but care must be taken to see that the rod slides freely through the bushing and to eliminate any frictional engagement which mght cause the rod to move the bushing. The resilient collar will conform to irregularities in the tubing and act to center the rod. Owing to its extreme resiliency, it will be self-adjusting and self-aligning.

What I claim and desire to secure by Letters Patent, is:

1. A guide for well pumping rods including, an elongate guide member adapted to receive a pump rod, said guide member having an annular circumferentially recessed portion and a resilient collar surrounding said member in said recessed portion and adapted to frictionally engage in a well tubing and remain stationary therein.

2. A guide for well pumping rods including, an elongate bushing having a reduced shank intermediate its ends, and a resilient collar surrounding the shank of the bushing and adapted to frictionally engage in a tubing and remain stationary therein.

3. A guide for well pumping rods including, an elongate bushing having a reduced shank intermediate its ends, and an annular element comprising a spring coil surrounding the shank of the bushing and having its convolutions arranged to frictionally engage the inner wall of a tubing to hold the guide stationary in said tubing.

4. A guide for well pumping rods including, an elongate longitudinally split sectional bushing having a shank intermediate its ends, and an annular element comprising a spring coil surrounding the shank of the bushing and having its convolutions arranged to frictionally engage longitudinally the inner wall of a tubing to hold the guide stationary in said tubing, the coil having a diameter greater than the inner diameter of the tubing and adapted to be deformed by engaging the tubing.

5. A guide for well pumping rods including, an elongate bushing having a reduced shank intermediate its ends, affording opposed annular shoulders, and a resilient collar comprising an annular coiled spring element surrounding the shank of the bushing and held in place by its shoulders, the outer surface of the spring element being adapted to engage frictionally in a tubing, so as to remain stationary within said tubing, the said bushing being adapted to receive the pumping rod and to guide the same.

6. A guide for well pumping rods adapted to be inserted in the usual tubing including, an elongate bushing having shoulders and a reduced shank between said shoulders, a resilient collar comprising a coiled spring surrounding the shank and holding said bushing spaced from the well tubing so that oil may freely pass between said bushing and tubing.

7. A guide for well pumping rods adapted to be inserted in the usual tubing including, a bushing having shoulders with a reduced portion between said shoulders, a resilient collar comprising a coiled spring seated in said reduced portion to hold said bushing stationary within said tubing and spaced therefrom, the part of said coiled spring in contact with the reduced portion extending vertically of said reduced portion.

8. A guide for well pumping rods adapted to be inserted in the usual tubing including, a bushing having shoulders with a reduced portion between said shoulders, a resilient collar comprising a coiled spring seated in said reduced portion to hold said bushing stationary within said tubing and spaced therefrom, the inner and outer parts of said spring contacting said bushing and tubing respectively extending vertically and with rounded edges at the top and bottom of said vertical portions.

9. A guide for well pumping rods adapted to be inserted in the usual tubing including, a bushing having shoulders with a reduced portion between said shoulders, a resilient collar comprising a coiled spring seated in said reduced portion to hold said bushing stationary within said tubing and spaced therefrom, one of said shoulders forming a cam surface over which said spring may be inserted.

10. A guide for well pumping rods adapted to be inserted in the usual tubing including, an elongate bushing having shoulders and a reduced shank between said shoulders, a resilient collar comprising a coiled spring surrounding the shank and holding said bushing spaced from the well tubing so that oil may freely pass between said bushing and tubing, one of said shoulders forming a cam surface over which said spring may be inserted.

FERI A. THAHELD.